UNITED STATES PATENT OFFICE.

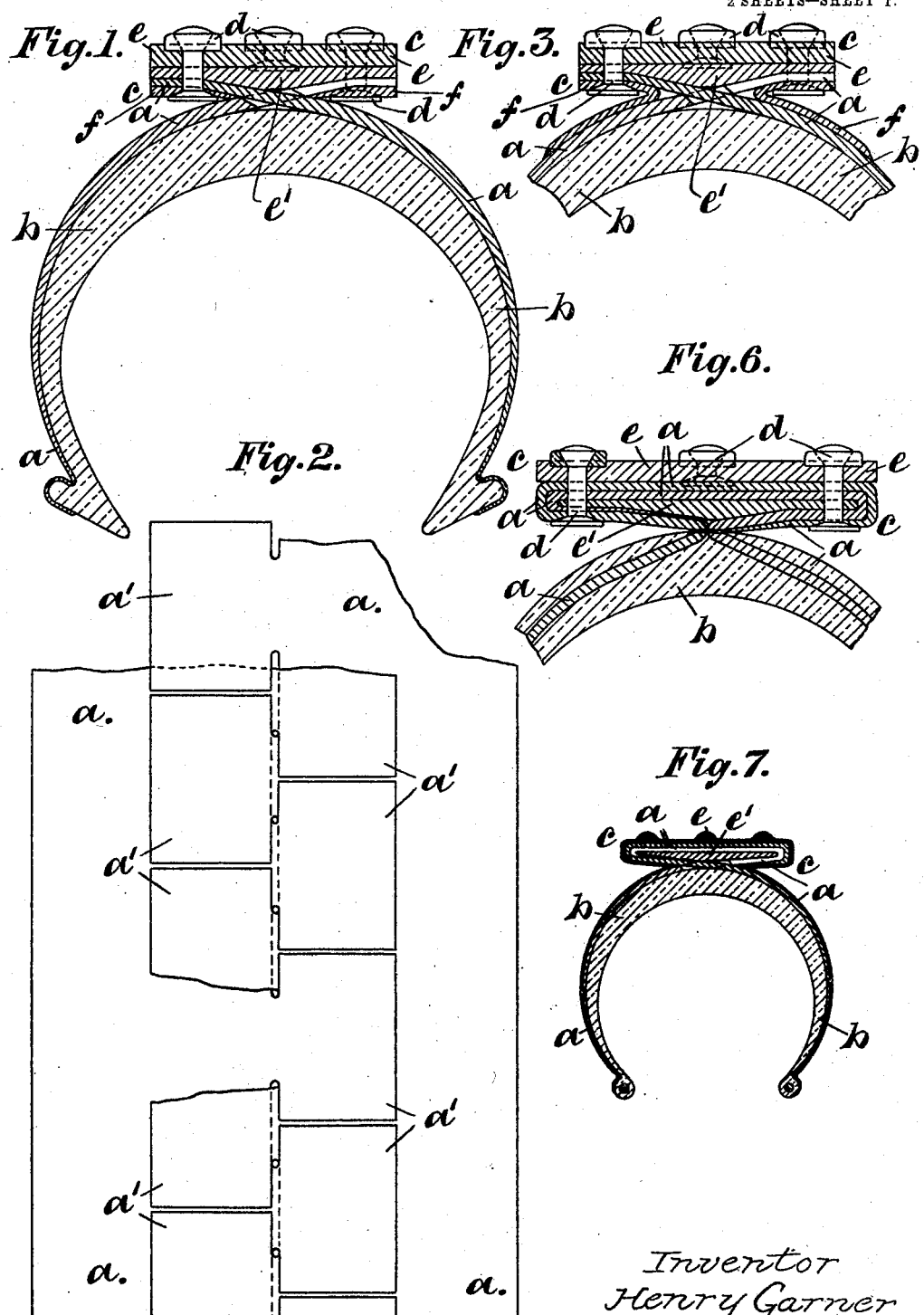

HENRY GARNER, OF NANTWICH, ENGLAND.

VEHICLE-WHEEL TIRE.

No. 795,906.  Specification of Letters Patent.  Patented Aug. 1, 1905.

Application filed November 14, 1904. Serial No. 232,663.

*To all whom it may concern:*

Be it known that I, HENRY GARNER, a subject of the King of England, residing at 22 Hospital street, Nantwich, in the county of Chester, England, have invented new and useful Improvements Connected with Vehicle-Wheel Tires, of which the following is a specification.

This invention has reference to vehicle-wheel tires and to the construction of or means used in connection with same by which side slipping or skidding of the vehicles is obviated and punctures or cutting of the tires is prevented, and the type of such means employed for these purposes which this invention has more particularly reference to is that which has on it a tread portion provided with steel or other studs or projections. Hitherto one of the chief defects of this construction of anti-side-slip means and puncture-preventer has been generally that it wears or destroys the tire-cover rapidly, and consequently is a costly expedient for accomplishing the objects referred to. Then, also, when the tread portion is much worn the whole protector-cover becomes useless and a complete new one has to be substituted.

This invention has for its object and effect, among others, to provide an anti-slide-slip means and puncture-preventer which will not destroy or damage the tire-cover or tire proper and at the same time furnish a detachable tread portion carrying the studs or projections, so that this portion when worn can be removed and a new one provided without removing or destroying the whole appliance.

According to this invention, attached directly or indirectly to or formed in one with the tire proper or a tire-cover is a tread-band practically flat on its outer or tread surface and connected to the tire-cover or tire outer part by a circumferential central connection, and so as to enable this tread-band portion and the other part to have movement in relation to each other transversely to the central plane of the wheel, and so forming a species of circumferential continuous hinge.

Illustrations of some forms and constructions of parts of the improvements hereunder are given in the annexed drawings, and the invention will be further described with reference to them, the novel characteristics of the invention being set out in the claiming clauses concluding the specification.

Figure 4:
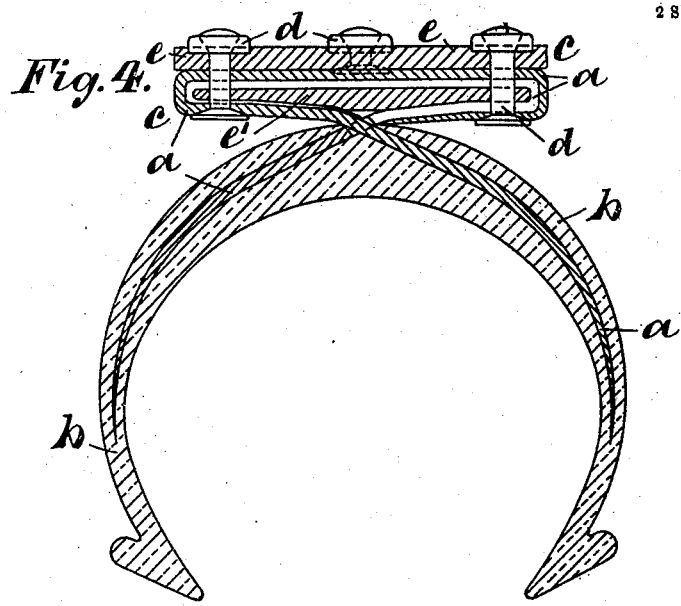
Figure 5:
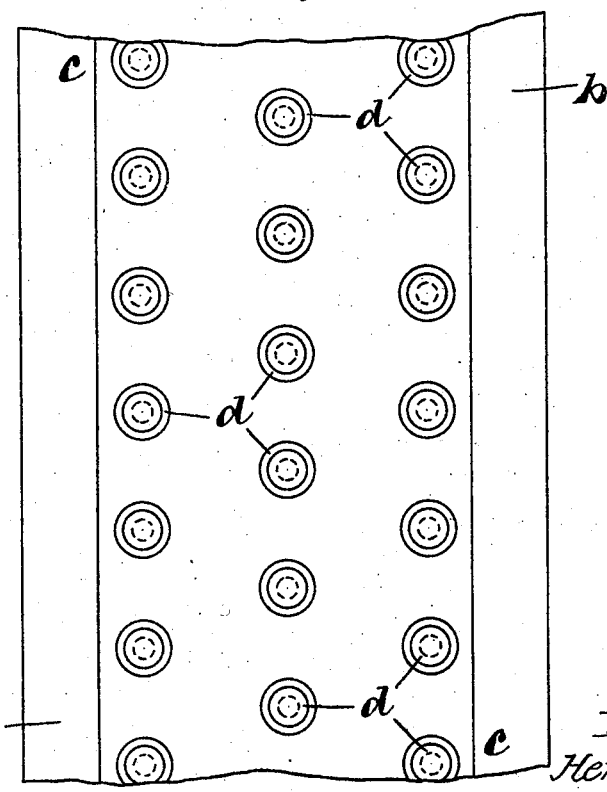

In the drawings, Figure 1 is a cross-section showing a pneumatic-tire cover proper with my improvements applied to it, and Fig. 2 is a plan showing the construction of the base portion thereof. Fig. 3 is a cross-section showing a slight modification of the construction shown in Figs. 1 and 2. Fig. 4 is a cross-section of tire, showing a modification in which the tread construction is built up in the tire-cover, and Fig. 5 is an outside plan of same. Fig. 6 is a cross-section of tire, illustrating a modification of the mode of fastening or holding the base portions of the tread together. Fig. 7 shows a pneumatic-tire cover having a tread according to this invention applicable more particularly to man-driven cycles and the like.

In the construction shown in Figs. 1 and 2 there is a foundation or base portion $a$, adapted to be suitably adhered onto the outside of the tire-cover proper, $b$, and outside this is the tread portion $c$ of the width of tread required and secured to the main portion $a$ by a central continuous circumferential connection, hereinafter described, so that the two sides of the tread overhang or project outward from the connection. The tread portion $c$ carries the metal or other non-slip studs or pieces $d$, and these studs or pieces bind the laminæ or parts forming the tread portion together and to the base-band or foundation. This base or foundation band $a$ in this case is made of two parts interlocked with each other by headed tabs $a'$, formed by cutting in it in the inner edges inverted-T-shaped cuts. The tabs on one side pass through spaces between and interlock with corresponding headed tabs on the opposite side half, the edges of the heads near their bases, which overlap each other, forming an interlocking means. Thus these heads furnish two continuous but interrupted flanges on the outside of the band, and to these flanges an inner tread-strip $e'$, which lies outside them, and the main outer tread-strip or tread proper, $c$, are attached by the shanks of the studs $d$. It will be seen that with regard to the outside rows of the studs $d$ both their heads which come in contact with the road-surface and their opposite ends are accessible, and consequently when they are worn down on the outside by friction and contact with the road they can be easily removed and new studs inserted and, if desired, a complete new outer band $e$ used, which in most cases would be done. This outer tread-band $e$ may also carry in many cases additional sets of studs $d$ in itself, as shown, the inner heads or parts of which lie on its under side and outside the intermediate band $e'$, which receives the pressure of the studs and serves as a protection to the base portion $a$ $a'$ and the tire-cover $a$ being worn or destroyed by these inner portions of these studs. Hence an old or worn outer tread-strip $e$ can be taken away and a new one put on very easily and inexpensively.

The construction shown in Fig. 3 differs from that shown in Figs. 1 and 2 only in that a channel or V-shaped strip $f$ is provided between the under side of the overhanging edges of the tread $c$ and the base $a$ and fastened to the tread by the stud-fastenings $d$ and to the base $a$ by a suitable adhesive or stitching or other suitable fastening, while in Fig. 1 there is only a plain strip $f$ under the rivets.

As a modification of the constructions above described the base $a$ may be made in one piece and the under tread-strips $e'$ fastened to the base by stitching the two together by a central circumferential row or rows of stitching or other suitable mode of fastening them; otherwise this construction is the same as that shown in Figs. 1 to 3, and the characteristics of the circumferentially-hinged tread $c$ is provided.

In the construction shown in Figs. 4 and 5 the tab portions $a'$ of the base part $a$ form a part of the tread part $c$, they being longer than those shown in Figs. 1 to 3, and are wrapped round the inner tread strip or band $e'$ and about each other, and all are fastened together by the stud rivets or fastenings $d$. In this construction, furthermore, the two sides of the base $c$ are built up in and are practically integral with the tire-cover $b$.

With regard to the material or materials of which this anti-side-slipping and puncture-preventing tread or band or parts of it are made these can be any such as are appropriate—as, for instance, they may be made of leather or material analogous to it or canvas solutioned together or partly of leather and partly of canvas or other suitable material, and they may be partly or wholly covered with rubber on the outside or not, as may be desired. Hence it will be understood the invention is in no way restricted to any particular materials of which the whole or the several parts may be made so long as it or they is or are appropriate to the purpose and fitted to stand the stresses and wear and meet the conditions and requirements which obtain in autovehicle and other pneumatic wheel-tires.

A modified construction of tire-tread under the invention is shown in Fig. 6, and it consists, mainly, in forming the hinge portion of the tread by stitching or similarly fastening the main base parts together and turning them outward and folding them about each other. The folds and parts are fastened together by stud-fastening, as in the other constructions shown, or by adhering them together by suitable adhesive or in any equivalent manner.

The construction shown in Fig. 7 is more particularly adapted for tires of man-driven cycles, the tread portion $c$ in this case being without metal studs, but may be provided with a rubber-studded surface or an irregular surface, such as are used on cycle-tires. In this case the outer surface of the parts may be covered with rubber including the surface of the tread portion $c$. The form of type of construction of the parts of the tread in this case is that set forth with reference to Figs. 4 and 5—namely, it is of the construction wherein the base is made up of two parts with interlocking tabs, which are folded up into the tread in the manner described.

With regard to the use of studs or projections on the treads according to this invention these may be of metal or of any material that may be suited to the nature of the vehicle to which they may be applied, and, if desired, studs or projections may be dispensed with, as the tread in itself, by virtue of its form and construction and the manner of its connection with the tire-cover or tire and mobility in the transverse direction, constitutes an anti-side-slip or skidding appliance or means as well as a puncture-preventer.

What is claimed is—

1. In a tire, a tread portion outside the tire-cover, or tire proper, and of a substantially flat surface, and connected with the tire or tire-cover by a continuous central circumferential connection forming a hinge portion to the tread part, about which it is capable of moving in the transverse direction, substantially as set forth.

2. In a tire, a tread portion outside the tire-cover, or tire proper, and of a substantially flat surface, and connected with the tire or tire-cover by a continuous central circumferential connection, forming a hinge portion to the tread part, about which it is capable of moving in the transverse direction; and stud-fasteners, extending through the overhanging edges of the tread portion, by which the said studs are held, and which hold the laminæ, of which it is composed, together; substantially as set forth.

3. In a tire, a tread portion outside the tire-cover, or tire proper, comprised of a base portion consisting of two parts, one edge of each of which is adapted to pass through the other, through apertures in the adjacent parts, and forming continuous uninterrupted flanges outside the tire, and a band fitting on the outside of these flanges, and fastened to them by through-fasteners; substantially as set forth.

4. In a tire, a tread portion outside the tire-cover, or tire proper, and comprised of a base portion, consisting of two parts, one edge of each of which is adapted to pass through the other, through apertures in the adjacent parts, and forming a continuous interrupted flange outside the tires; the said flanges being folded across the tread, and upon one another, and inclosing a band within them; substantially as set forth.

5. In a tire, a tread portion outside the tire-cover or tire proper, comprising a base $a$, and a tread portion $c$, the base $a$ being comprised of two parts $a$, having headed tabs $a'$ along one edge, separated at their edges, by cuts in a direction at right angles to the length of the strips, and on their inner edges by cuts extending inward in the direction of the length of the strip, through which cuts the adjacent tabs pass, and said tabs interlocking, and forming laterally-extending continuous flanges, outside the base portion and the points of interlocking forming a continuous circumferential hinge, as set forth.

In testimony whereof I have signed my name to this specification in the presence of two subscribing witnesses.

HENRY GARNER.

Witnesses:
SOMERVILLE GOODALL,
WALTER HARRISON.